(12) United States Patent
Vanderzyden

(10) Patent No.: US 7,401,588 B1
(45) Date of Patent: Jul. 22, 2008

(54) CYLINDER BLOCK WITH UNLINED PISTON BORES

(75) Inventor: Henry R. Vanderzyden, Byron, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 8 days.

(21) Appl. No.: 10/703,244

(22) Filed: Nov. 7, 2003

Related U.S. Application Data

(62) Division of application No. 10/050,728, filed on Jan. 16, 2002, now Pat. No. 6,702,908.

(51) Int. Cl.
*F02B 75/18* (2006.01)

(52) U.S. Cl. ............... 123/193.2; 123/193.6; 123/56.1; 123/56.9

(58) Field of Classification Search ....... 123/56.1–56.9, 123/193.2, 193.6
See application file for complete search history.

(56) References Cited

U.S. PATENT DOCUMENTS

| | | | |
|---|---|---|---|
| 3,169,488 A | | 2/1965 | Galliger |
| 3,280,758 A | | 10/1966 | Leeming |
| 3,319,575 A | | 5/1967 | Havens |
| 3,628,237 A | | 12/1971 | Ziegler |
| 3,707,035 A | | 12/1972 | Alger |
| 3,864,815 A | | 2/1975 | Koch |
| 3,906,924 A | * | 9/1975 | Elsbett ..................... 123/193.6 |
| 4,068,645 A | | 1/1978 | Jenkinson |
| 4,149,498 A | * | 4/1979 | Ferrell ....................... 123/56.7 |
| 4,372,156 A | | 2/1983 | Meismer |
| 4,445,258 A | | 5/1984 | Caldwell |
| 4,446,906 A | | 5/1984 | Ackerman |
| 4,492,188 A | * | 1/1985 | Palmer et al. .............. 123/56.8 |
| 4,497,358 A | | 2/1985 | Gnadig |
| 4,779,579 A | | 10/1988 | Sukava |
| 4,915,064 A | * | 4/1990 | Mannerstedt et al. ..... 123/51 B |
| 4,980,996 A | * | 1/1991 | Klink et al. .................... 451/51 |
| 4,986,230 A | | 1/1991 | Panyard |
| 5,048,470 A | * | 9/1991 | Geddes et al. ......... 123/184.42 |
| 5,115,791 A | * | 5/1992 | Dore .......................... 123/572 |
| 5,191,864 A | * | 3/1993 | Santi ........................ 123/193.2 |
| 5,655,854 A | * | 8/1997 | Foulk .......................... 408/1 R |

(Continued)

FOREIGN PATENT DOCUMENTS

KR    2001059220 A  *  7/2001

(Continued)

*Primary Examiner*—M. McMahon
(74) *Attorney, Agent, or Firm*—Carlson, Gaskey & Olds

(57) ABSTRACT

A cylinder block for an axial piston pump or motor is formed from a steel material. The block includes a plurality of bores that each have an internal bore surface of a predefined final material surface finish. The bores are subjected to various machining and heat treating processes to provide a bore surface formed from the same material as the cylinder block, and which has the desired final surface finish. Pistons are mounted within each of the bores for axial movement relative to the cylinder block. Each of the pistons is formed from a steel material and has an exterior surface that is in sliding contact with the internal bore surface. The subject cylinder block is processed to provide a steel-to-steel interface between the bore and piston and eliminates the need for liners to be specially formed or installed within each piston bore.

22 Claims, 8 Drawing Sheets

U.S. PATENT DOCUMENTS

| | | | | |
|---|---|---|---|---|
| 5,850,814 | A * | 12/1998 | Fenn et al. | 123/195 R |
| 5,862,852 | A | 1/1999 | Shibata | |
| 5,891,273 | A | 4/1999 | Ruckert | |
| 6,041,499 | A * | 3/2000 | Matsuura et al. | 29/888.06 |
| 6,152,090 | A * | 11/2000 | Fujimoto et al. | 123/41.74 |
| 6,180,183 | B1 | 1/2001 | Wentland | |
| 6,298,818 | B1 | 10/2001 | Koyama | |
| 6,526,927 | B1 * | 3/2003 | Palmer | 123/56.1 |
| 6,575,130 | B2 * | 6/2003 | Feikus | 123/193.2 |
| 6,662,775 | B2 * | 12/2003 | Hauser | 123/241 |
| 6,702,908 | B1 * | 3/2004 | Vanderzyden | 148/622 |
| 2002/0000038 | A1 * | 1/2002 | Matuura et al. | 29/888.06 |
| 2002/0033160 | A1 * | 3/2002 | Feikus | 123/193.1 |
| 2002/0127073 | A1 * | 9/2002 | Chancey | 409/192 |

FOREIGN PATENT DOCUMENTS

WO     WO 83/02482     7/1983

\* cited by examiner

CYLINDER BLOCK WITH UNLINED PISTON BORES

This application is a divisional of Ser. No. 10/050,728 filed on Jan. 16, 2002 now U.S. Pat. No. 6,702,908.

BACKGROUND OF THE INVENTION

This invention relates to a cylinder block for an axial piston pump or motor that is subjected to a unique manufacturing process to provide piston bores that do not require liners.

Axial piston pumps and motors are used in various applications in the aerospace industry. These pumps and motors are subjected to severe load requirements and often operate in harsh environmental conditions. Each pump and motor traditionally includes a cylinder block with a plurality of piston bores formed therein that each receive a piston in a reciprocating relationship. The block is coupled for rotation which a shaft and works in conjunction with the reciprocating pistons to operate as a pump or motor.

The loading and environmental conditions in which these pumps and motors operate exert high levels of stress on the cylinder block and pistons. High stress levels can result in increased piston bore wear and can ultimately lead to cracking or fracture within the cylinder block. To increase reliability and reduce maintenance and service operations it is desirable to have a minimal amount of wear within each piston bore.

Traditionally, the piston bores have inserts installed within each bore to provide an improved frictional surface for the piston. One example is shown in U.S. Pat. No. 3,319,575, which utilizes bushings in each bore to reduce wear. It is difficult to manufacture the bushings to the tight tolerances required for the application. It also increases assembly time and cost to perform multiple insert operations on the cylinder block to install the bushings in the bores. Another example is shown in U.S. Pat. No. 6,180,183, which utilizes a process for casting bronze piston liners in each of the bores. This process is time consuming and expensive.

Thus, it is desirable to provide method for manufacturing a cylinder block that eliminates the need for piston bore inserts or liners. It is also desirable for the process to reduce costs and assembly time in addition to overcoming the above referenced deficiencies.

SUMMARY OF THE INVENTION

The subject invention provides a cylinder block for an aircraft pump or motor that includes unlined piston bores. The cylinder block is formed from a predetermined material, such as steel, and includes a plurality of piston bores formed within the cylinder block. Each of the bores has a bore engagement surface having a predefined material surface finish. A piston is mounted within each one of the bores. Each piston defines an engagement piston surface that is in direct sliding contact with the engagement bore surface.

The method for making the cylinder block includes the following steps. The cylinder body is turned to a rough shape. Each of the piston bores are machined to an initial rough shape. The cylinder is heat treated to achieve a desired hardness. Then the bore is finish machined to a predetermined surface finish to define a final bore surface for direct engagement with a piston surface.

Additional steps include attaching a valve plate to one end of the cylinder block. Preferably, the valve plate is diffusion bonded to the cylinder block by applying a predetermined pressure force against the valve plate and heating the valve plate and cylinder block to a predetermined temperature to achieve a predefined bond strength.

The subject invention provides an improved cylinder block that eliminates the need for piston bore inserts or liners. These and other features of the present invention can be best understood from the following specification and drawings, the following of which is a brief description.

DETAILED DESCRIPTION OF AN EXEMPLARY EMBODIMENT

Figure 1:
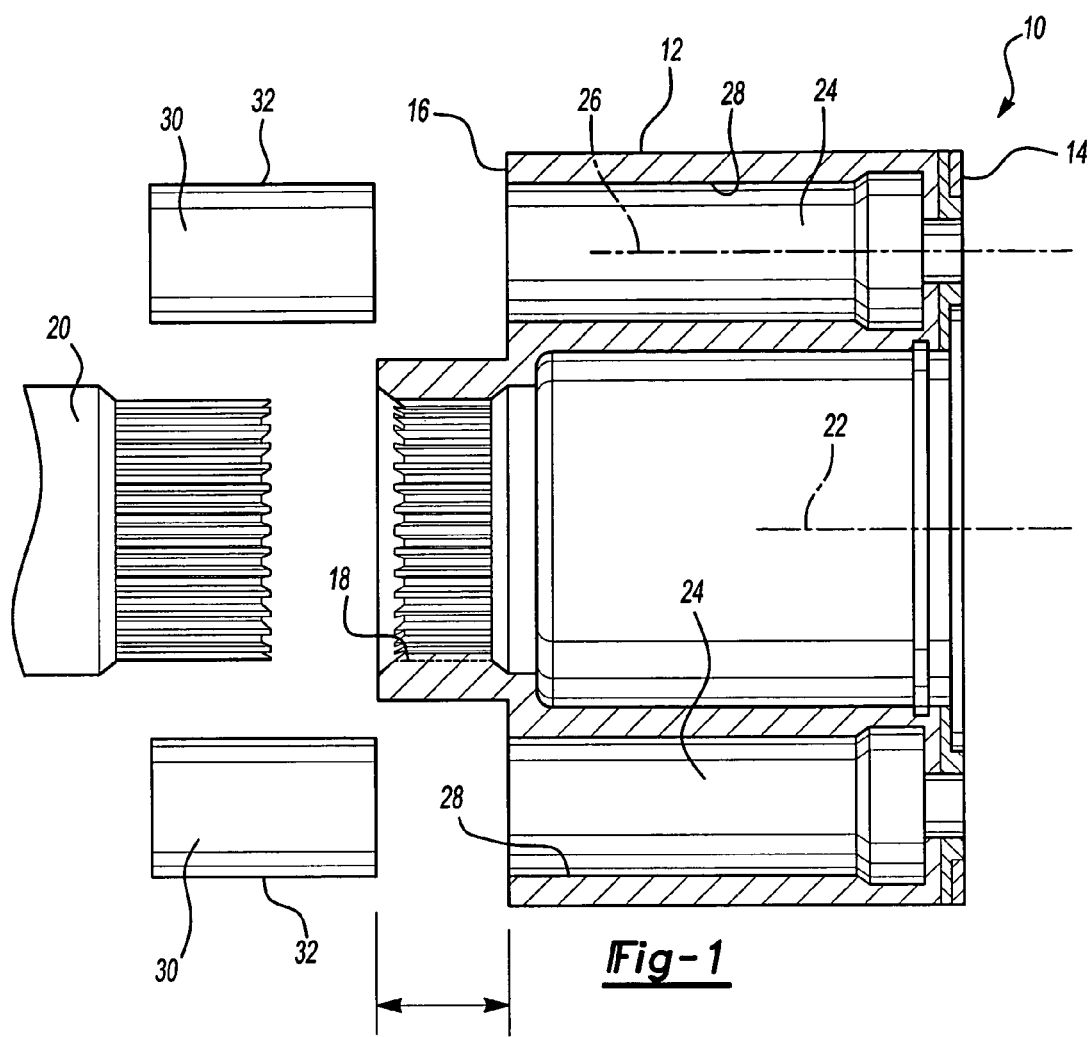
FIG. 1 is a schematic exploded view of a cylinder block, shaft and piston assembly made according to the inventive process.

A schematic view of a cylinder block assembly is shown generally at 10 in FIG. 1. The cylinder block assembly 10 includes a body 12 that has a first end 14 and a second end 16 facing in an opposite direction for the first end 14. Body 12 is preferably cylindrically shaped but can be formed in other configurations. The body 12 preferably includes a center spline portion 18 for mating engagement with a splined shaft 20 that defines an axis of rotation 22. While a spline configuration is preferred, it should be understood that other similar mating configurations known in the art could also be used. When the shaft 20 is installed within the center spline portion 18, the body 12 can be rotated for use in a conventional pump or motor application. Preferably, the subject cylinder block 10 is used in aircraft power systems.

The main body 12 includes a plurality of piston bores 24 that define bore axes 26, which extend parallel to the axis of rotation 22. The bores 24 are preferably spaced in an annular pattern about the axis of rotation 22. Preferably, the cylinder block 10 includes nine (9) bores, however, a greater number or reduced number of bores can also be formed within the body 12. Each bore 24 is machined to a final bore surface finish 28. This process will be discussed in greater detail below.

Pistons 30 are mounted within each bore 24 in a reciprocating relationship to drive the pump or motor. Each piston 30 defines a piston engagement surface 32 that is in direct sliding contact with the final bore surface finish 28. Preferably, both the body 12 and the piston 30 are formed from steel such that the contact between the block 10 and the pistons 30 is a steel-to-steel interface. While steel is the preferred material, other similar materials known in the art can also be used.

Figure 2:
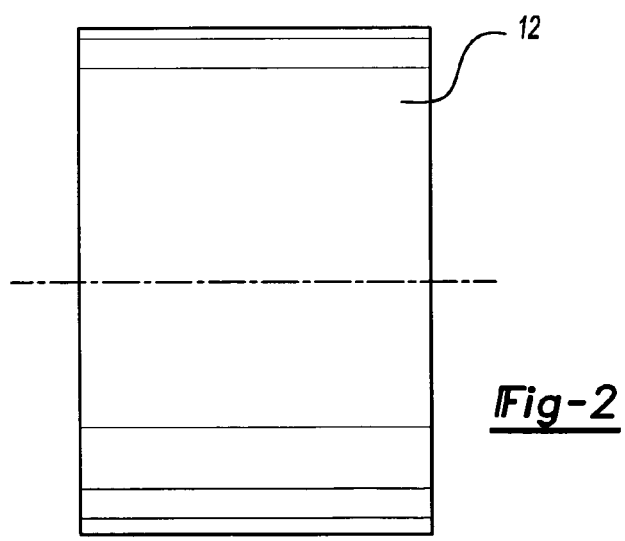
FIG. 2 is a side view of the cylinder block.
Figure 3:
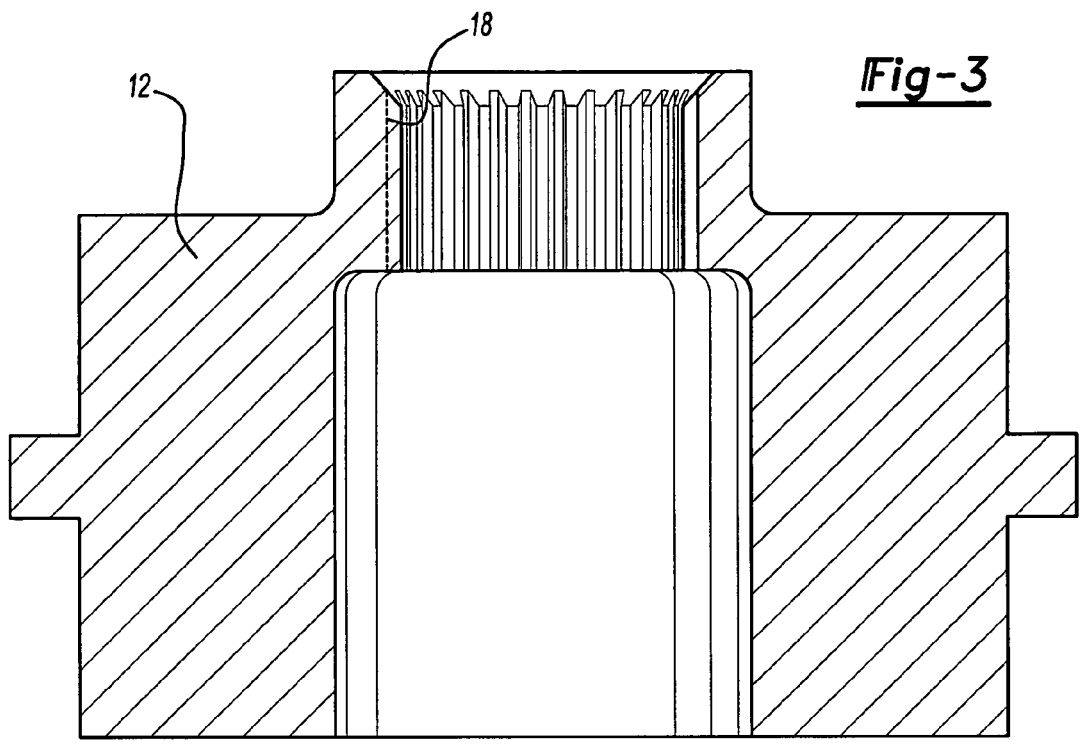
FIG. 3 is a cross-sectional view of the cylinder block of FIG. 1 after broaching.
Figure 4:
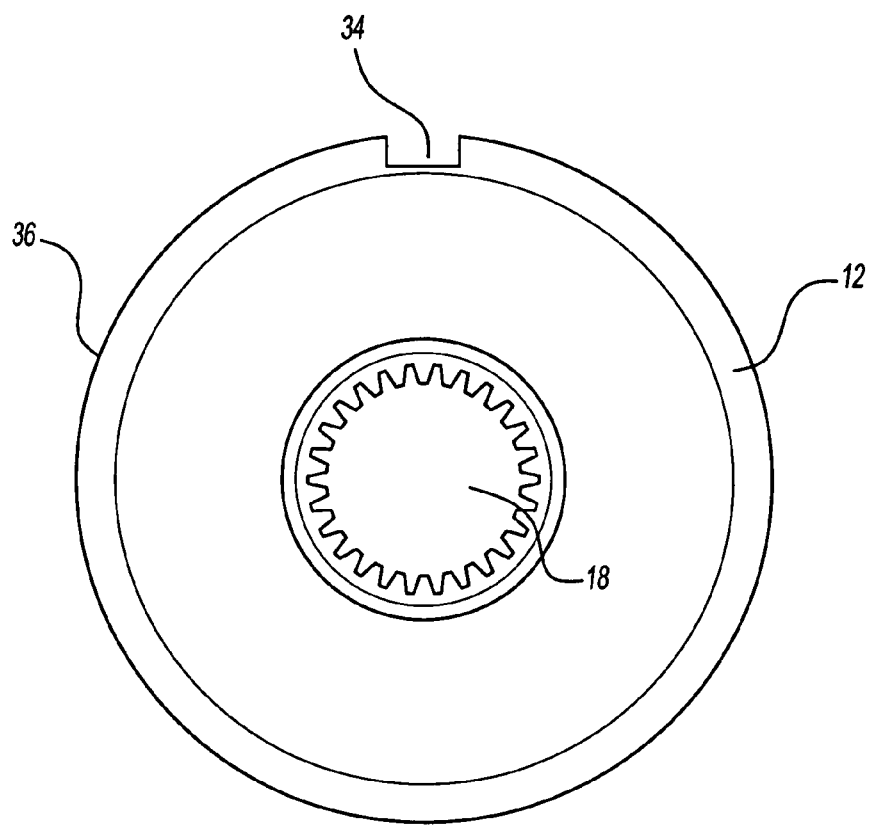
FIG. 4 is an end view of the block of FIG. 3 with a timing slot machined in the outer surface.

As shown in FIG. 2, the block body 12, formed from a desired material, is cut to the proper length and is turned to a rough shape. As discussed above, the body 12 is preferably turned into a cylindrical shape. Next, the splined bore 18 is broached, see FIG. 3. Next, a timing slot 34 is machined into the outer surface 36 of the body 12, shown in FIG. 4. The timing slot 34 is used as a reference to correctly locate each of the piston bores 24.

Figure 5A:
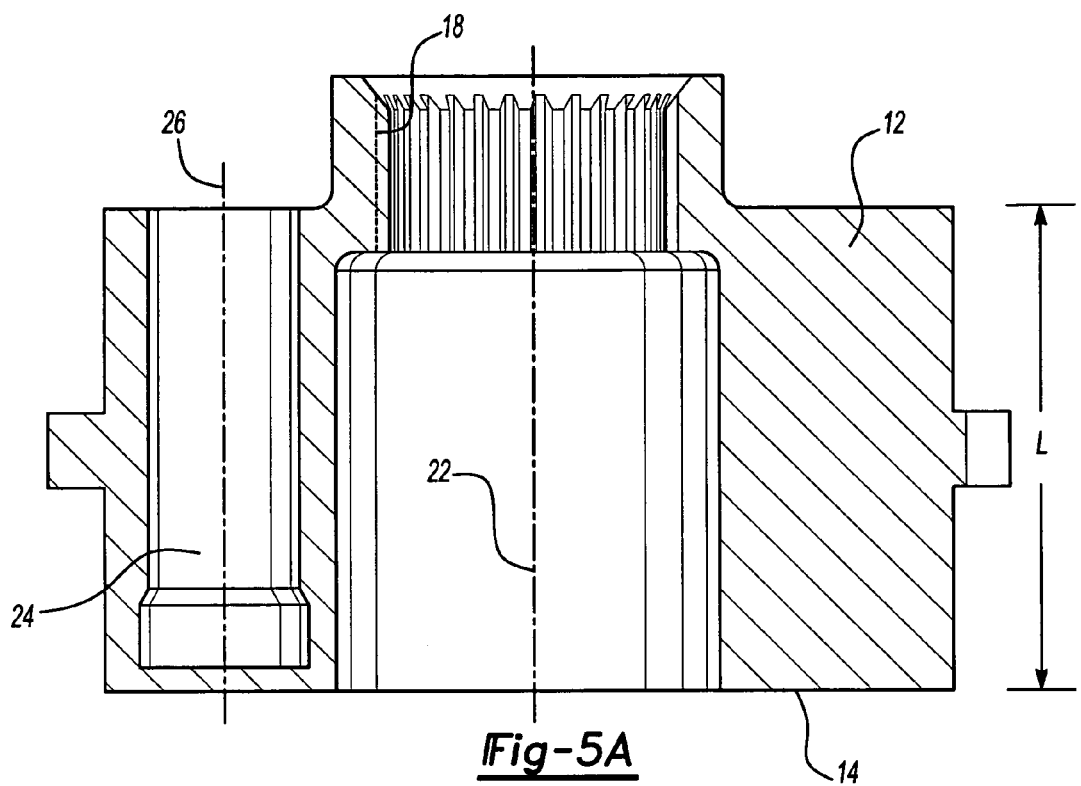
FIG. 5A is a cross-sectional view of the block of FIG. 4 with a piston bore.
Figure 5B:
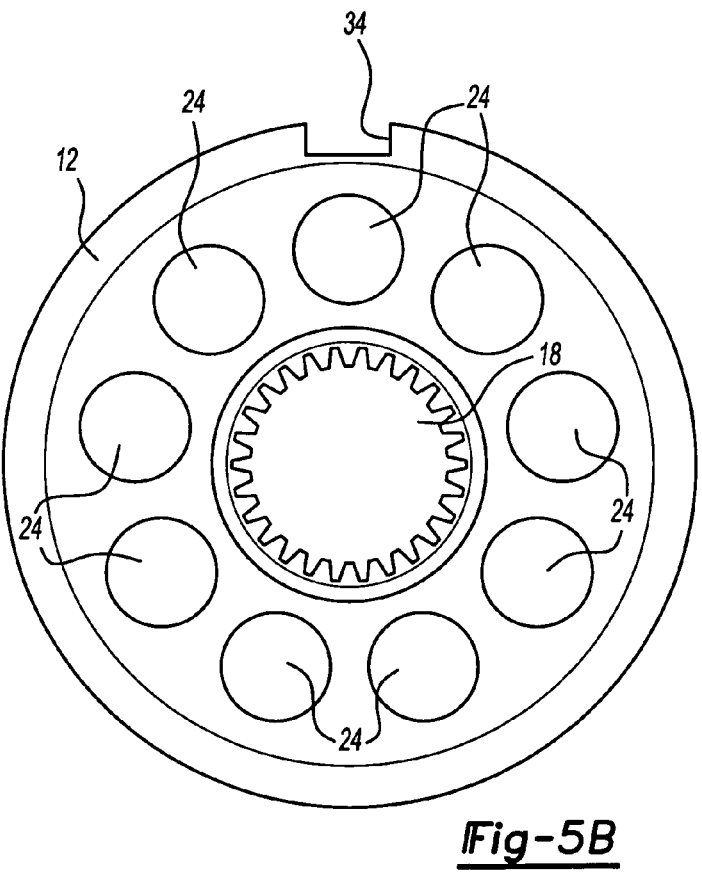
FIG. 5B is an end view of the block of FIG. 5A.

As shown in FIGS. 5A and 5B, a plurality of piston bores 24 are formed into a rough shape. Preferably, each of the bores 24 is milled and drilled to an initial size and shape. Preferably, the bores 24 are formed in an annular pattern about the center splined bore 18 such that each bore axis 26 is parallel to the axis of rotation 22.

The face at the first end 14 is then lapped to achieve a desired flatness. This first end 14 is preferably the end opposite from the splined bore 18 that mates with the shaft 20. The lapping process also achieves the desired overall length L for the body 12, shown in FIG. 5A.

Next, a valve plate 40 is attached to the end opposite from the splined bore 18. Preferably, the valve plate 40 is diffusion bonded to the body 12 by applying a predetermined pressure force against the valve plate 40 and body 12 and heating the valve plate 40 and body 12 to a predetermined temperature to achieve a predefined bond strength. The pressure and heat are applied for a predetermined length of time determined by the desired bond strength.

Figure 6A:
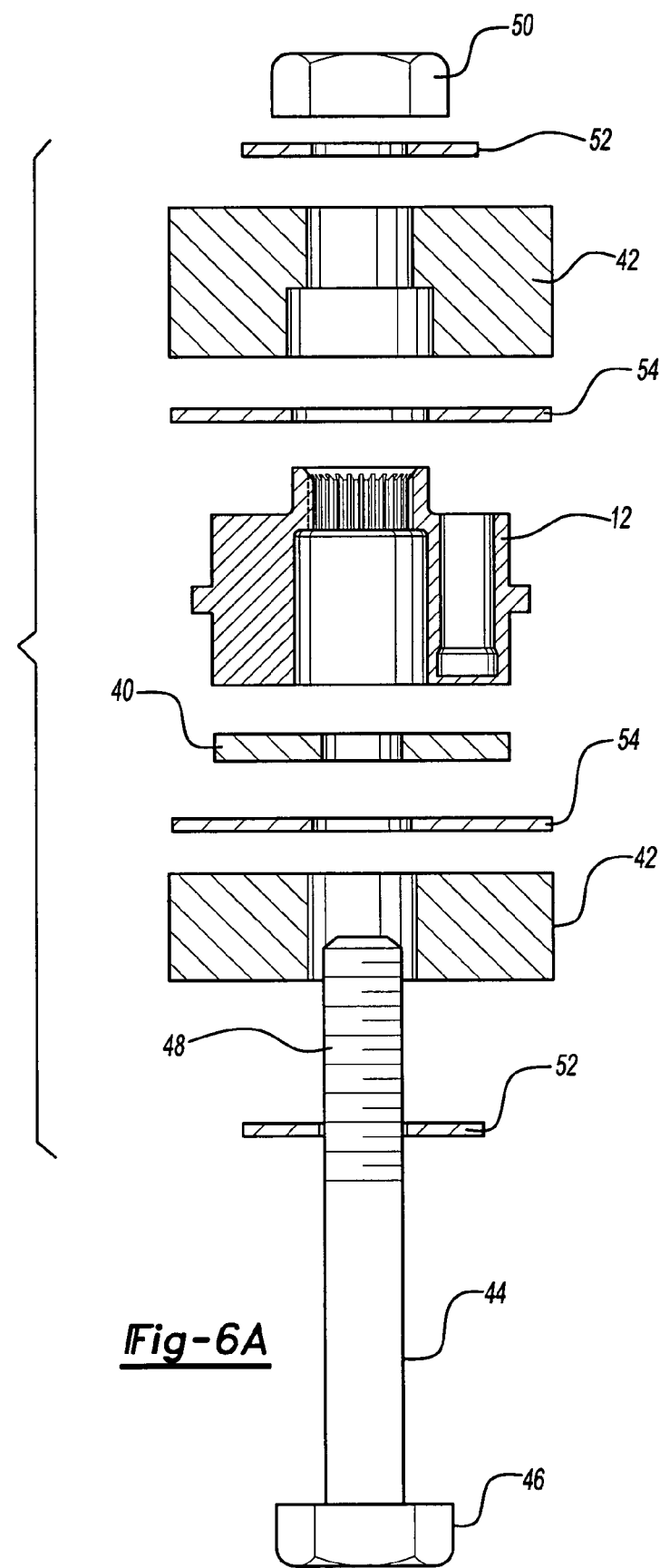
FIG. 6A is an exploded view of a fixture assembly for diffusion bonding of the valve plate to the cylinder body.
Figure 6B:
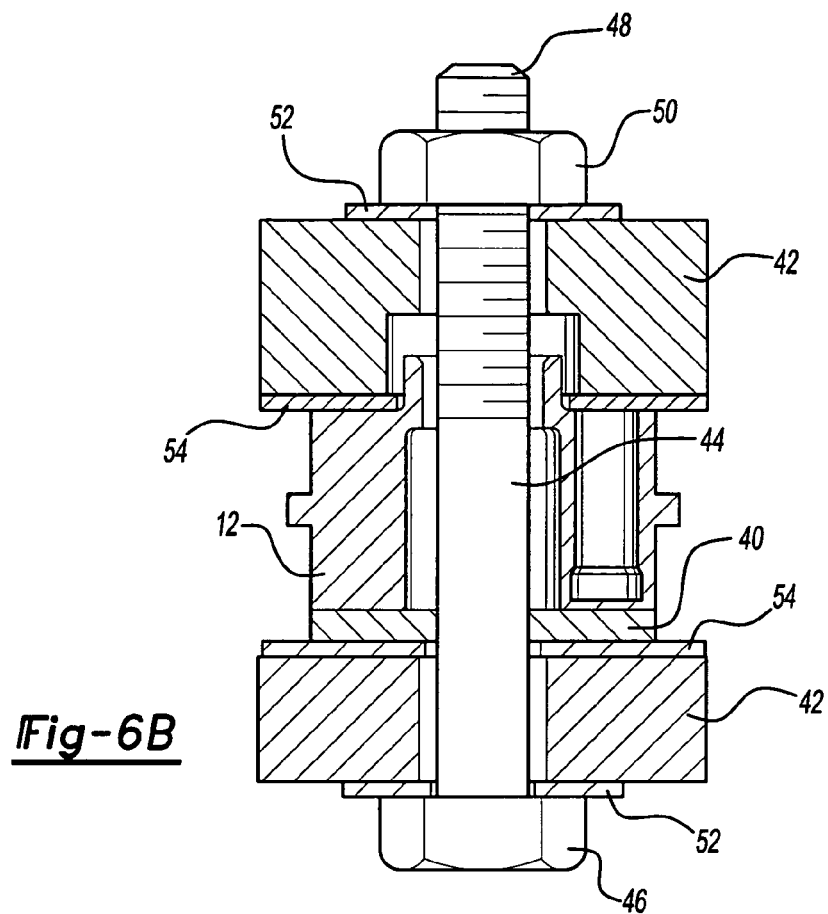
FIG. 6B is an assembled view of FIG. 6A.

As shown in FIGS. 6A and 6B the valve plate 40 is placed against the first end 14 of the body 12. The valve plate 40 and body 12 are positioned between a pair of fixtures 42. A bolt 44 or other similar device is inserting through the valve plate 40, through the body 12, and through both fixtures 42. The bolt 44 has a head portion 46 that extends to a threaded end 48. After the bolt 44 has been inserted through the plate 40, body 12, and fixtures 42 the head portion 46 rests against one of the fixtures 42 and the threaded end 48 extends beyond the other fixture 42. A nut 50 is installed on the threaded end 48 and is tightened against the other of the fixtures 42 to achieve the predetermined pressure for the diffusion bonding process. Preferably, washers 52 are placed between the head portion 46 and the fixture 42 and between the nut 50 and the fixture 42. Preferably, gaskets 54 are placed between the valve plate 40 and one fixture 42 and between the body 12 and the other fixture 42.

Diffusion bonding then occurs in a vacuum furnace (not shown) at a predetermined temperature for a predetermined length of time to achieve a desired bond strength. The pressure, temperature, and length of time varies depending on the type of materials and the size and weight of the body 12 and plate 40. The assembly is removed from the furnace and the bolt 44 is unfastened. Then the body 12 is tempered to a hardness of approximately 50-55 RC.

Figure 7:
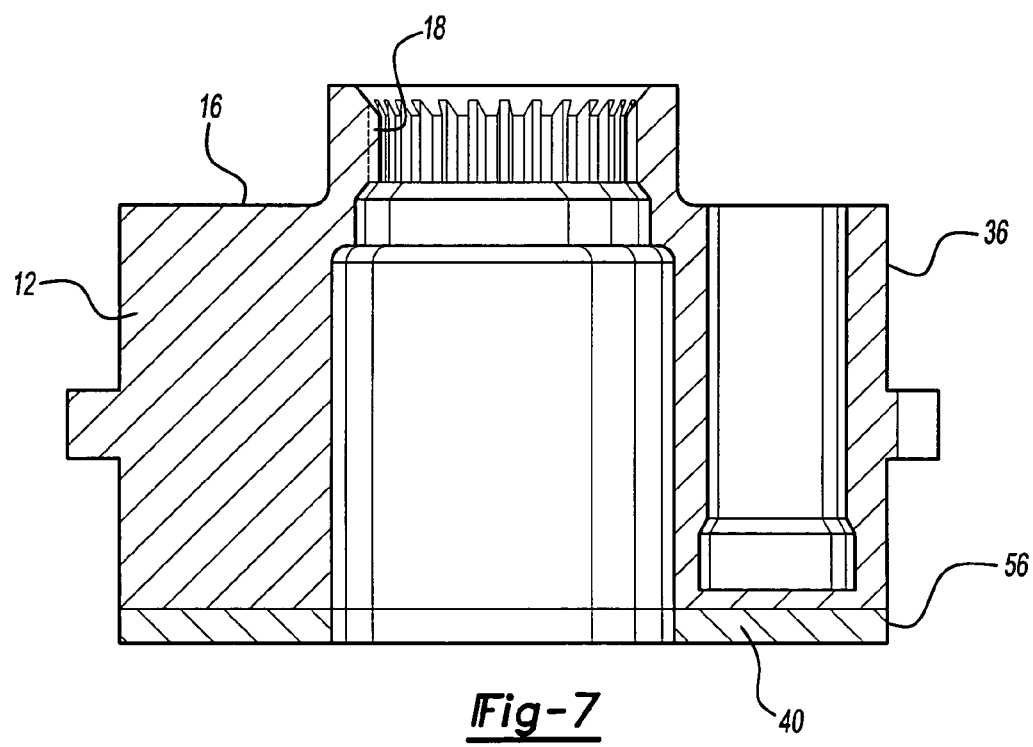
FIG. 7 is a cross-sectional view of the block of 6A after diffusion bonding.

Once the plate 40 is attached to the body 12. The external surface 36 of the body 12 is turned to an intermediate shape, shown in FIG. 7. The external surface 56 of the plate 40 is also turned during this process such that the body 12 and the plate 40 are of the same outer diameter. Additional machining steps include grinding the center splined bore 18 to a desired final form, grinding the outer surface 36 to an intermediate shape, and grinding the splined end 16 to a desired length.

Figure 8A:
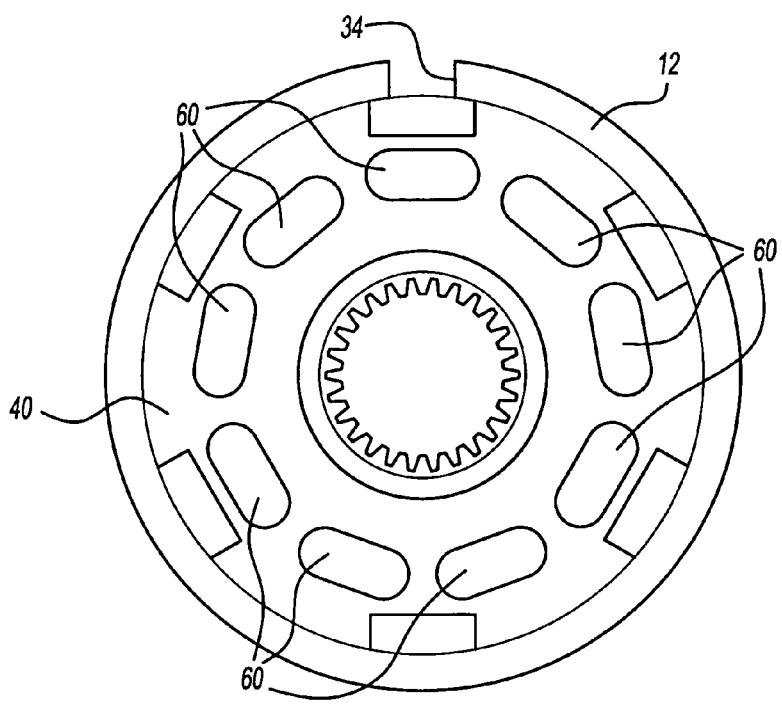
FIG. 8A is an end view of the block of FIG. 7 with kidneys milled into the valve plate.
Figure 8B:
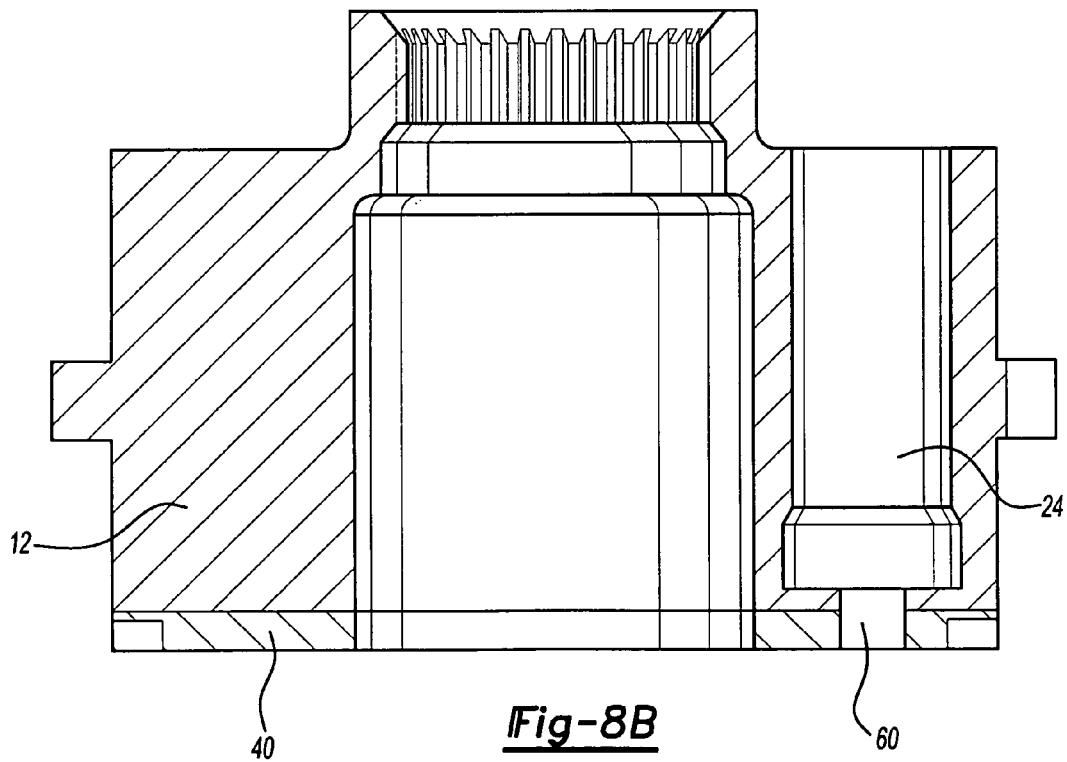
FIG. 8B is a cross-sectional view of FIG. 8A.

Next, openings 60, referred to as kidneys, are milled into the plate 40, see FIG. 8A. The kidneys 60 are formed as elongated oval openings and are aligned over the piston bores 24. The kidneys 60 are milled all the way through the plate 42 and through the end 14 of the cylinder block body 12 as shown in FIG. 8B. The other pump or motor portion is mounted to the valve plate 40 opposite from the cylinder block body 12. The kidneys 60 help disperse the oil between the pump or motor halves.

Figure 9:
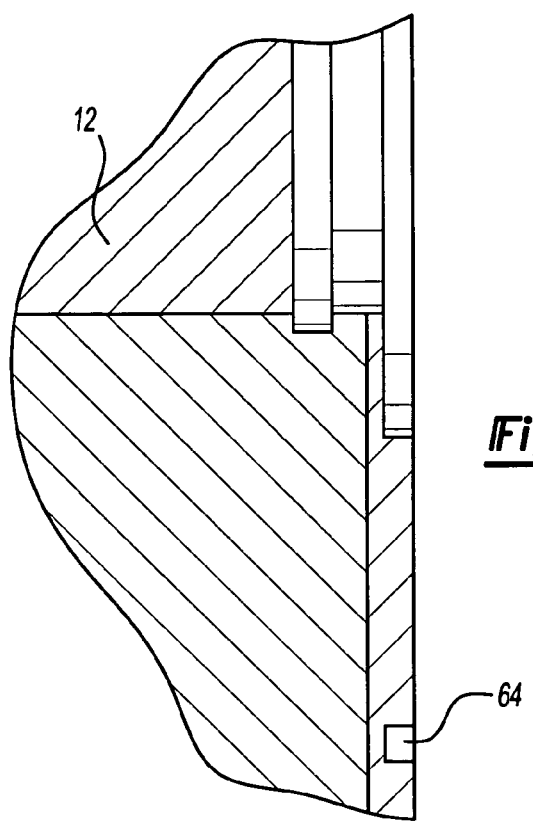
FIG. 9 is cross-sectional view, partially broken away, of the cylinder block body with a groove.

Drainage slots 62 and a groove 64 are milled into the end 14 of the cylinder block body 12, see FIG. 9. The slots 62 are in communication with the groove 64. As the cylinder block 10 rotates, there is some oil leakage. The leakage flows into the groove 64, which drains into the slots 62.

Figure 10A:
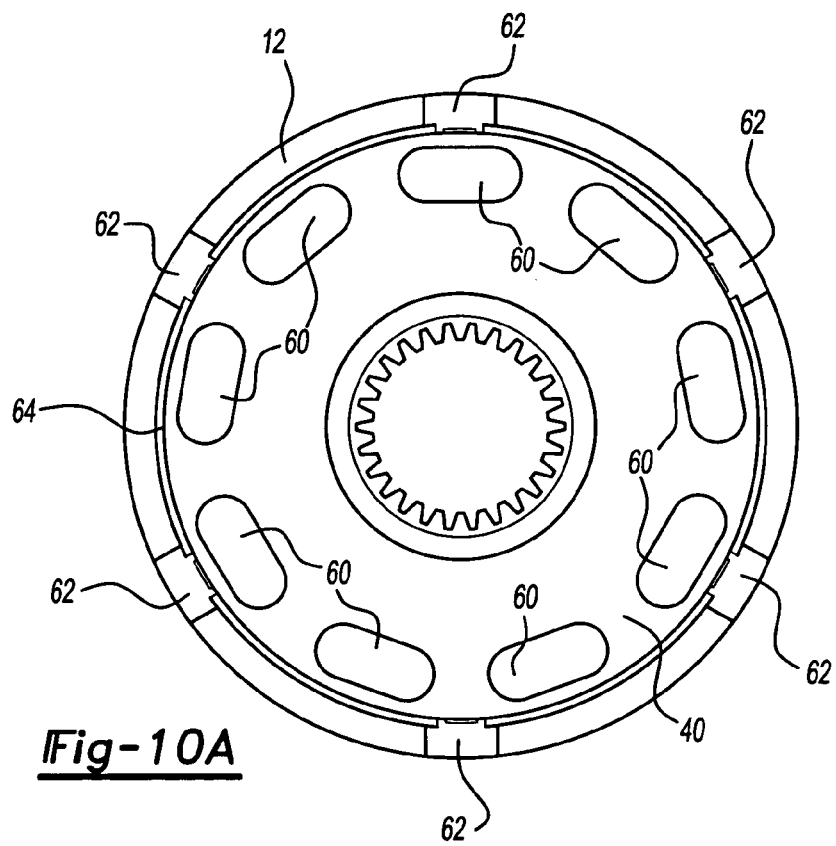
FIG. 10A is an end view of the final cylinder block assembly.
Figure 10B:
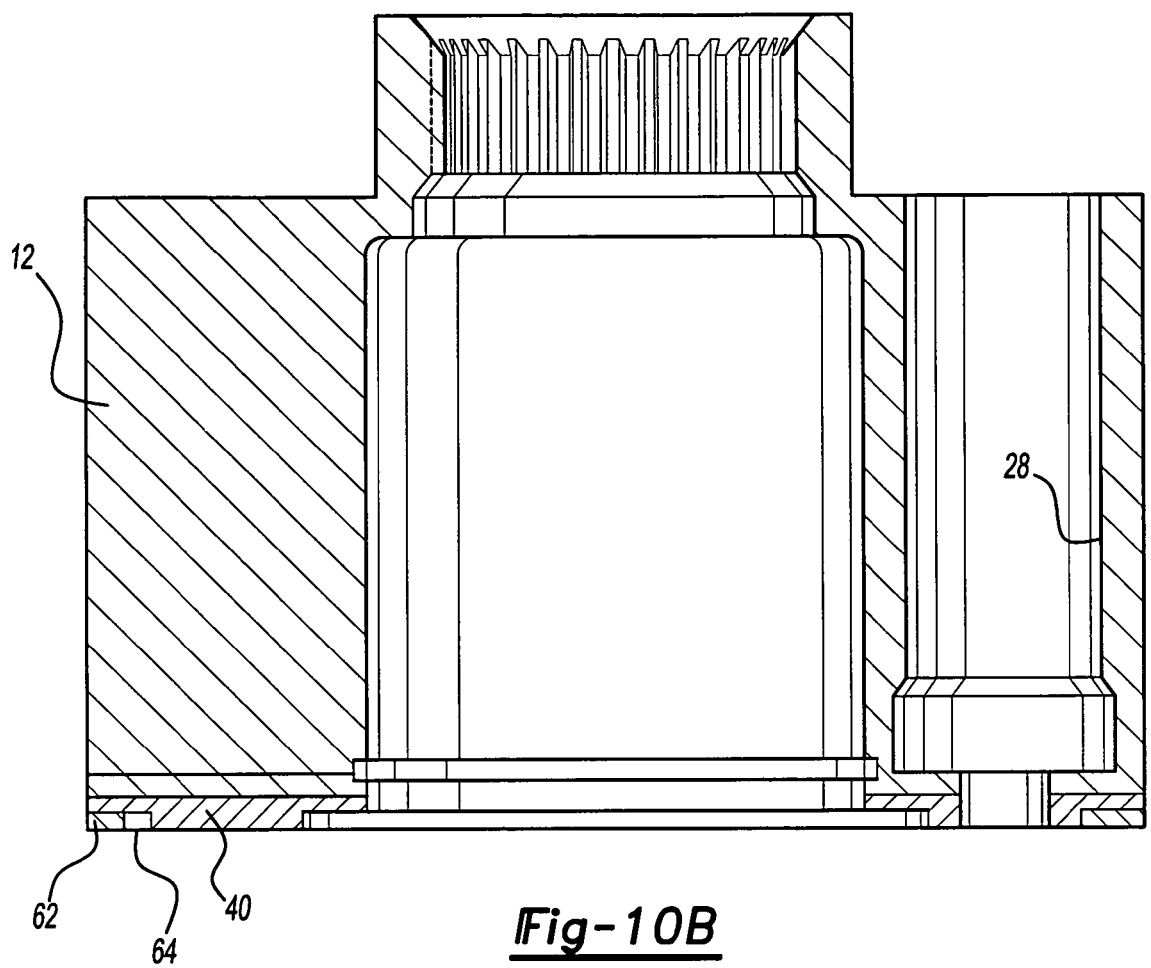
FIG. 10 B is a cross-sectional view of the block of FIG. 10A.

Next, the bores 24 are ground to a rough size and the outer surface 36 is turned to a final shape. In the turning process, the timing slot 34 is removed. Finally, the bores 24 are honed to a finished size and final surface finish 28, see FIGS. 10A and 10B. The final surface finish 28 is within a roughness average (Ra) of 1-30, however, the range of 6-16 Ra is preferred.

The subject invention provides a method for forming a cylinder block that does not require piston bore liners or inserts. The bore surface 28 is machined to a final surface finish that directly engages the piston 30 in sliding contact. The piston to bore interface operates efficiently under severe environmental conditions and under high loads.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

I claim:

1. A cylinder block with unlined piston bores comprising:
a cylinder block including a plurality of piston bores formed within said cylinder block and machined to a rough shape wherein said cylinder block is heat treated to achieve a desired bore surface hardness with at least one of said plurality of piston bores being finish machined to a predetermined surface finish to define a final bore surface that directly engages a piston surface, wherein each piston surface comprises a steel surface, and wherein said cylinder block and said final bore surface are formed from a unitary piece of steel material.

2. The cylinder block according to claim 1 wherein said cylinder block comprises a main body extending along a longitudinal axis with a first end and a second end facing opposite from said first end and including a valve plate attached to at least one of said first and second ends such that said valve plate is positioned at an open end of each of said plurality of piston bores.

3. The cylinder block according to claim 2 wherein said valve plate is diffusion bonded to said at least one of said first and second ends by applying a predetermined pressure force against said valve plate and cylinder block, and heating said valve plate and cylinder block to a predetermined temperature to achieve a predefined bond strength between said valve plate and said cylinder block.

4. The cylinder block according to claim 2 wherein said main body includes a splined bore for receiving a rotating shaft wherein said splined bore is formed generally at a center of said main body to define said longitudinal axis.

5. The cylinder block according to claim 4 wherein said plurality of bores are formed in an annular pattern about said longitudinal axis with each bore defining a bore axis that is parallel to said longitudinal axis and wherein each of said bores includes an open end facing said second end and an enclosed end facing said first end.

6. The cylinder block according to claim 2 wherein said main body includes a timing slot positioned along an outer surface of said main body and wherein each of said bores is machined relative to said timing slot to form an annular pattern spaced about said longitudinal axis.

7. The cylinder block according to claim 1 including a plurality of pistons comprising one piston mounted within each one of said piston bores wherein each of said pistons includes said piston surface that is in sliding contact with said final bore surface.

8. The cylinder block according to claim 1 wherein said cylinder block is tempered to achieve said desired bore surface hardness.

9. The cylinder block according to claim 1 wherein said cylinder block includes a heat treated surface.

10. The cylinder block according to claim 9 wherein said final bore surface comprises a machined surface.

11. The cylinder block according to claim 3 including a diffusion bond formed between said at least one of said first and second ends and said valve plate.

12. The cylinder block according to claim 8 including a tempered surface on said cylinder block.

13. The cylinder block according to claim 12 wherein said tempered surface has a hardness within a range of 50 to 55 Rc.

14. The cylinder block according to claim 11 wherein said valve plate includes a valve plate external surface defined by a first outer diameter and said main body includes a main body external surface defined by a second outer diameter that is the same as said first outer diameter.

15. The cylinder block according to claim 10 wherein said predetermined surface finish has a roughness average within a range of 1 to 30 Ra.

16. The cylinder block according to claim 15 wherein said predetermined surface finish has a roughness average within a range of 6 to 16 Ra.

17. The cylinder block according to claim 2 including a plurality of openings extending entirely through a thickness of said valve plate and extending into said at least one of said first and second ends of said main body with each opening being aligned with one piston bore.

18. A cylinder block with unlined piston bores comprising:
a cylinder block including a plurality of piston bores formed within said cylinder block and machined to a rough shape wherein said cylinder block is heat treated to achieve a desired bore surface hardness with at least one of said plurality of piston bores being finish machined to a predetermined surface finish to define a final bore surface that directly engages a piston surface, said cylinder block comprising a main body extending along a longitudinal axis with a first end and a second end facing opposite from said first end, and including a valve plate attached to at least one of said first and second ends such that said valve plate is positioned at an open end of each of said plurality of piston bores, and including a plurality of drainage slots and a groove formed in said at least one of said first and second ends of said main body, wherein said plurality of drainage slots are in fluid communication with said groove such that leaking fluid received within said groove during operation is drained via said plurality of drainage slots.

19. A cylinder block for an aircraft engine with unlined piston bores comprising:
an aircraft engine cylinder block comprised of a steel material and having a main body extending along a longitudinal axis with a first end and a second end facing opposite from said first end, and wherein said main body includes a splined bore to receive a rotating shaft wherein said splined bore is formed generally at a center of said main body to define said longitudinal axis, and including a plurality of piston bores formed within said main body in an annular pattern about said longitudinal axis with each piston bore defining a bore axis that is parallel to said longitudinal axis and wherein each of said piston bores includes an open end facing said second end and an enclosed end facing said first end, and wherein each of said piston bores is machined to a rough shape with said aircraft engine cylinder block including a heat treated surface to provide a desired bore surface hardness, and wherein each of said plurality of piston bores is finish machined to a predetermined surface finish to define a final bore surface, with said final bore surface and said main body being formed from a unitary piece of material;
a valve plate attached to said second end and positioned to be associated with said open ends of each of said piston bores, and including a diffusion bond formed between said second end and said valve plate; and
a plurality of pistons comprising one piston mounted within each one of said piston bores, and wherein each of said pistons includes a steel piston surface that is in direct sliding contact with said final bore surface.

20. The cylinder block according to claim 19 wherein said main body includes a tempered surface having a hardness within a range of 50 to 55 Rc, and wherein said predetermined surface finish has a roughness average within a range of 6 to 16 Ra.

21. The cylinder block according to claim 20 including a plurality of drainage slots and a groove formed in said second end of said main body, wherein said plurality of drainage slots are in fluid communication with said groove such that leaking fluid received within said groove during operation is drained via said plurality of drainage slots.

22. The cylinder block according to claim 21 wherein said valve plate includes valve plate external surface defined by a first outer diameter and said main body includes a main body external surface defined by a second outer diameter that is the same as said first outer diameter, and including a plurality of openings extending entirely through a thickness of said valve plate and extending into said second end of said main body with each opening being aligned with one piston bore.

* * * * *